Patented Oct. 6, 1925.

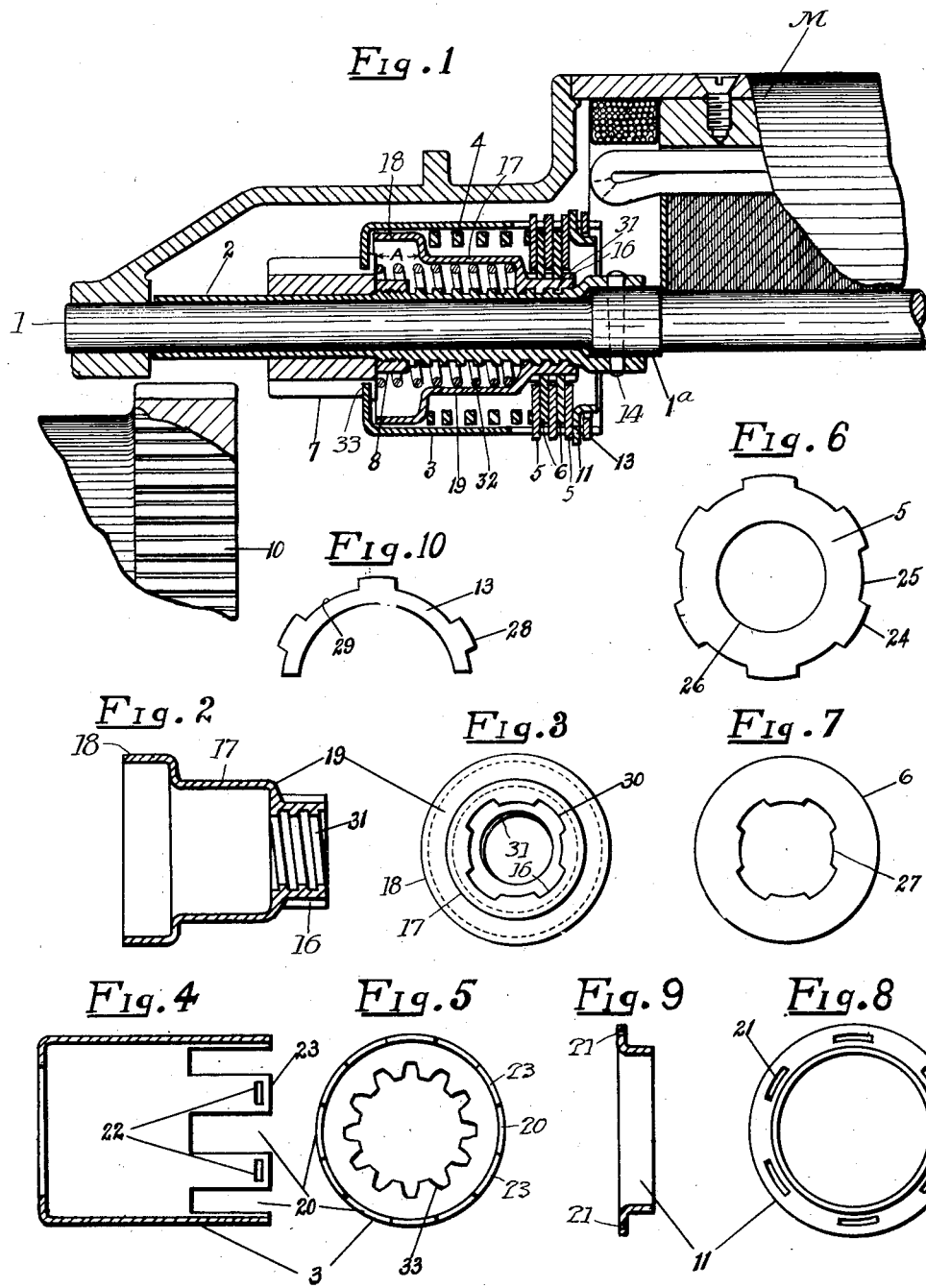

1,556,351

UNITED STATES PATENT OFFICE.

JULIUS H. RICHARDS, OF TORRINGTON, CONNECTICUT, ASSIGNOR TO ECLIPSE MACHINE COMPANY, OF ELMIRA, NEW YORK, A CORPORATION OF NEW YORK.

ENGINE STARTER.

Application filed October 18, 1923. Serial No. 669,203.

*To all whom it may concern:*

Be it known that I, JULIUS H. RICHARDS, a citizen of the United States, residing at Torrington, in the county of Litchfield and State of Connecticut, have invented certain new and useful Improvements in Engine Starters, of which the following is a specification.

My invention relates to a starter for starting internal combustion engines or the like and the same pertains more particularly to the drive or transmission located between the prime mover such as an electric motor and a member of the engine to be started such as the flywheel thereof. The object of my invention is to provide a comparatively simple but efficient and reliable drive of this character, whose advantages in construction and mode of operation will be apparent from the description hereinafter given.

In the drawing, Figure 1 is a sectional elevation of a starting apparatus embodying my invention illustrating a portion of the starting motor and a portion of the fly-wheel of the engine; Fig. 2 a longitudinal section of the sleeve nut; Fig. 3 an end view thereof; Fig. 4 a longitudinal section of the barrel; Fig. 5 an end view thereof; Figs. 6 and 7 elevations of plates of the friction clutch; Fig. 8 an elevation of the locking ring; Fig. 9 a cross section thereof; and Fig. 10 an elevation of one of the locking keys.

In the present instance, I have shown my invention embodied in a drive of the outboard type and also of the direct drive type, although it will be understood that the same is applicable to the inboard type and also to the indirect drive type.

Referring to the embodiment of my invention as herein shown, the motor M has an extended armature shaft 1 provided with an enlargement 1ª to which the screw shaft 2 is secured at its inner end. This screw shaft has a plain portion at its outer end on which the driving member or pinion 7 is adapted to slide, and a screw threaded portion towards its inner end on which the nut 19 which has screw threads 31 is threaded for longitudinal movement along such shaft when rotated and for rotary movement therewith when arrested in its longitudinal movement. The inner end of the screw shaft is enlarged so as to fit upon the enlargement of the shaft 1. This screw shaft which is a hollow shaft fits over the armature shaft and is secured thereto in a suitable manner as by means of a pin 14.

The nut 19 is operatively connected with the pinion 7 by means of a friction clutch composed of the plates 5 and 6, and by a barrel 3. This clutch has two sets of plates which are of a suitable number, one set 6 thereof being splined upon the nut 19 by means of the internal projections 27 which engage the slots or grooves 16 of the nut. The other set of plates 5 are splined to the barrel by reason of the projections 24 and intervening recesses 25 which cooperate with the longitudinal slots 20 of the barrel. By these means, the nut clutch and barrel are drivingly connected rotarily but such parts have a relative longitudinal movement one with respect to the other.

The barrel is provided at its inner end with a locking ring 11 provided with slots 21 through which pass the tongues 23 formed between the slots 20. A pair of locking keys 13 having projections 28 and intervening recesses 29 serve to lock the ring in place, such projections 28 passing through the slots 22 in the tongues 23.

The barrel has serrations 33 at its forward end to engage and interlock with the pinion 7 whereby such parts are in effect splined to each other. The barrel is thus drivingly connected with the pinion and has a longitudinal movement relative thereto.

The nut 19 has a forward shell extension of two diameters 17 and 18. Between the outer shoulder of the junction at these two diameters and the clutch there is interposed a comparatively heavy coil spring 4 which sets up the clutch to the extent necessary for transmitting the torque required for the starting of the engine under normal conditions. Within such shell extension and interposed between the pinion and the body of the nut, there is interposed a lighter spring 32 whose function is to keep the parts in their normal relative positions shown in Fig. 1 but adapted to yield in case of the abutting of the pinion teeth against the flywheel teeth. In this event, the pinion will be stopped in its longitudinal movement and the nut will continue to advance towards the pinion thereby compressing the spring 32. In this movement, the barrel moves longitudinally along the pinion teeth and the extent of the relative movement is indicated by the arrows A. The increased resistance to the movement of the nut causes a partial rotation thereof and consequently a partial rotation of the pinion with the result that such pinion will be brought into register and the spring 32, being now under compression, will expand and force the pinion into full mesh with the flywheel.

Describing the operation of the drive and starting with the parts in the normal position shown in Fig. 1, when the starting motor is energized, the armature shaft 1 and the screw shaft 2 will be rotated, whereupon the nut will advance automatically to the left, Fig. 1, carrying with it the whole shift assembly including clutch, barrel and pinion. The pinion will be thereby meshed with the flywheel teeth 10 and when the nut 19 contacts the stop collar or stop nut 8 it will rotate with the screw shaft and through the clutch and barrel it will rotate the pinion and consequently the flywheel. In this action, both the spring 4 and spring 32 remain idle and the clutch transmits the torque necessary for normal conditions but in the event of any excess resistance it will slip.

In case of the abutting of the pinion teeth and flywheel teeth which causes a stoppage of the longitudinal movement of the pinion, the nut 19 will continue to move outwardly, compressing the spring 32, until such nut is caused to partially rotate and thereby partially rotate the pinion resulting in proper mesh of these teeth in the manner hereinbefore explained.

I claim:

1. An engine starter drive including a rotatable shaft, a driving member mounted for longitudinal movement thereon to engage a member of the engine to be started, a control member mounted on the shaft for longitudinal movement thereon when such shaft is rotated and for rotary movement therewith, a friction clutch splined on the control member, and a connecting means connected at one end with the clutch and at the other end with the driving member.

2. An engine starter drive including a rotatable shaft, a driving member in the form of a pinion mounted for longitudinal movement thereon to engage a member of the engine to be started, a control member mounted on the shaft for longitudinal movement thereon when such shaft is rotated and for rotary movement therewith, a friction clutch splined on the control member, and a barrel operatively connected at one end with the clutch and at the other end with the teeth of the pinion.

3. An engine starter drive including a rotatable shaft, a driving member mounted for longitudinal movement thereon to engage a member of the engine to be started, a control member mounted on the shaft for longitudinal movement thereon when such shaft is rotated and for rotary movement therewith, a friction clutch, and a barrel operatively connected with the driving member by means of splines to permit free longitudinal movement of the barrel relative to the driving member, said clutch including a series of friction plates, one set of which is operatively connected with the barrel and the other set of which is splined to the control member.

4. An engine starter drive including a rotatable screw shaft, a pinion mounted loosely thereon for longitudinal movement thereon to engage a member of the engine to be started, a nut threaded on the shaft for longitudinal movement thereon when such shaft is rotated, and for rotary movement therewith, and a friction clutch having one set of clutch plates splined to the nut and a barrel connected at one end with the other set of clutch plates and at its other end splined to the driving member.

5. An engine starter drive including a rotatable screw shaft, a pinion mounted loosely thereon for longitudinal movement thereon to engage a member of the engine to be started, a nut threaded on the shaft for longitudinal movement thereon when such shaft is rotated, and for rotary movement therewith, a barrel operatively connected with the pinion and having a longitudinal movement independent thereof, and a friction clutch operatively connected with the barrel for rotating it, such clutch and barrel having an independent longitudinal movement, said clutch having friction plates splined to the nut.

6. An engine starter drive including a rotatable screw shaft, a pinion mounted loosely thereon for longitudinal movement thereon to engage a member of the engine to be started, a nut threaded on the shaft for longitudinal movement thereon when such shaft is rotated, and for rotary movement therewith, and provided with a forwardly extending shell, a friction clutch operatively connected with the pinion and with the nut, and a spring interposed between the clutch and the shell.

7. An engine starter drive including a rotatable screw shaft, a pinion mounted loosely thereon for longitudinal movement thereon to engage a member of the engine to be started, a nut threaded on the shaft for longitudinal movement thereon when such shaft is rotated, and for rotary movement therewith, and provided with a forwardly extending shell, a friction clutch operatively connected with the nut, and a barrel operatively connected at one end with the pinion and at the other end with the clutch, said shell being adapted to bear against the pinion end of the barrel.

8. An engine starter drive including a rotatable screw shaft, a pinion mounted loosely thereon for longitudinal movement thereon to engage a member of the engine to be started, a nut threaded on the shaft for longitudinal movement thereon when such shaft is rotated, and for rotary movement therewith, and provided with a forwardly extending shell having two diameters, a friction clutch operatively connected with the nut, a barrel operatively connected at one end with the pinion and at the other end with the clutch, and a spring interposed between the clutch and the larger diameter of the shell.

9. An engine starter drive including a rotatable screw shaft, a pinion mounted loosely thereon for longitudinal movement thereon to engage a member of the engine to be started, a nut threaded on the shaft for longitudinal movement thereon when such shaft is rotated, and for rotary movement therewith, and provided with a forwardly extending shell having two diameters, a friction clutch operatively connected with the nut, a barrel operatively connected at one end with the pinion and at the other end with the clutch, a comparatively heavy spring interposed between the clutch and the larger diameter of the shell, and a comparatively light spring interposed between the pinion and the smaller diameter of the shell.

JULIUS H. RICHARDS.